(12) United States Patent
Maruyama et al.

(10) Patent No.: US 11,650,579 B2
(45) Date of Patent: May 16, 2023

(54) INFORMATION PROCESSING DEVICE, PRODUCTION FACILITY MONITORING METHOD, AND COMPUTER-READABLE RECORDING MEDIUM RECORDING PRODUCTION FACILITY MONITORING PROGRAM

(71) Applicant: FUJITSU LIMITED, Kawasaki (JP)

(72) Inventors: Kazunori Maruyama, Zama (JP); Takeshi Soeda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 738 days.

(21) Appl. No.: 16/809,713

(22) Filed: Mar. 5, 2020

(65) Prior Publication Data
US 2020/0201309 A1    Jun. 25, 2020

Related U.S. Application Data

(63) Continuation of application No. PCT/JP2017/037388, filed on Oct. 16, 2017.

(51) Int. Cl.
*G05B 23/02* (2006.01)

(52) U.S. Cl.
CPC ............... *G05B 23/0245* (2013.01); *G05B 2219/32179* (2013.01); *G05B 2223/02* (2018.08)

(58) Field of Classification Search
None
See application file for complete search history.

(56) References Cited

U.S. PATENT DOCUMENTS

2012/0166142 A1    6/2012  Maeda et al.
2017/0169342 A1    6/2017  Waltinger

FOREIGN PATENT DOCUMENTS

| CN | 103177215 | | 6/2013 |
|---|---|---|---|
| CN | 106940679 | | 7/2017 |
| DE | 102015225144 | A1 | 6/2017 |
| EP | 3015936 | A1 | 5/2016 |
| JP | H08-50507 | A | 2/1996 |
| JP | 2008-118068 | A | 5/2008 |
| JP | 2011-59790 | A | 3/2011 |

(Continued)

OTHER PUBLICATIONS

Chinese Office Action dated Sep. 21, 2022 for corresponding Chinese Patent Application No. 201780095024.1, with English Translation, 26 pages. *Please note WO-2017-154844-A1 cited herewith, was previously cited in an IDS filed on Oct. 30, 2020.*.

(Continued)

*Primary Examiner* — Carlos R Ortiz Rodriguez
(74) *Attorney, Agent, or Firm* — Fujitsu Patent Center

(57) ABSTRACT

An information processing device includes: a memory; and a processor coupled to the memory and configured to: learn a classification rule that classifies an abnormal degree of a production facility from a text feature amount based on the text feature amount obtained from a number of texts included in a plurality of pieces of log data obtained in a predetermined process of the production facility and production history information of the production facility; extract a text feature amount of log data to be monitored obtained in the predetermined process of the production facility; and determine an abnormal degree of the production facility when the log data to be monitored is obtained based on the text feature amount and the classification rule.

11 Claims, 12 Drawing Sheets

(56) References Cited

FOREIGN PATENT DOCUMENTS

| | | |
|---|---|---|
| JP | 2012-160056 A | 8/2012 |
| JP | 2013-250925 A | 12/2013 |
| JP | 2015-32088 A | 2/2015 |
| WO | 2015/072085 A1 | 5/2015 |
| WO | 2017/149598 A1 | 9/2017 |
| WO | 2017/154844 A1 | 9/2017 |

OTHER PUBLICATIONS

European Office Action dated Dec. 23, 2020 for corresponding to European Patent Application No. 17929217.2, 7 pages. *Please note WO-2017/154844-A1, EP-3015936-A1 and DE-102015225144-A1 cited herewith, were previously cited in an IDS filed Oct. 30, 2020.*.
Extended European Search Report dated Aug. 7, 2020 for corresponding European Patent Application No. 17929217.2 dated Aug. 7, 2020.
International Search Report and Written Opinion of the International Searching Authority (Form PCT/ISA/210, 220, and 237), mailed in connection with PCT/JP2017/037388 and dated Jan. 16, 2018 (Total 9 pages).

FIG. 4

```
#Header
Logging Time : 2017/04/27 15:32:51
Equipment Name : ABCCDE #01

#Status
Temperature : 25.5 degC
Picker #01 Position : Home
Picker #02 Position : Home
Remaining Parts #01 : 315
Remaining Parts #02 : 206
Remaining Parts #03 : 124
Remaining Parts #04 : 550
Remaining Parts #05 : 137
Remaining Parts #06 : 78
Remaining Parts #07 : 101
Remaining Parts #08 : 192
Status : Ready

#Process
Program Name : FGH #03-02
Unit Name : JK43889-L302
Lot No. : OPQ31930
Serial No. : 00159
Start Time : 2017/04/27 15:33:03
--
End Time : 2017/04/27 15:41:27
Remaining Parts #01 : 293
Remaining Parts #02 : 206
Remaining Parts #03 : 120
Remaining Parts #04 : 513
Remaining Parts #05 : 135
Remaining Parts #06 : 77
Remaining Parts #07 : 93
Remaining Parts #08 : 184
Picker #01 Position : Home
Picker #02 Position : Home
```

| UNIT NAME | LOT NUMBER | SERIAL NUMBER | APPARATUS NAME | PROCESS NAME | START DATE AND TIME | END DATE AND TIME | PASS/FAIL |
|---|---|---|---|---|---|---|---|
| JK43889-L302 | OPQ31930 | 00159 | ABCCDE #01 | FGH #03-02 | 4/27/2017 15:33:03 | 4/27/2017 15:41:27 | NORMAL |
| ... | ... | ... | ... | ... | ... | ... | ... |
| JK43889-L302 | OPQ31930 | 00169 | ABCCDE #01 | FGH #03-02 | 4/27/2017 15:50:30 | 4/27/2017 16:12:46 | ABNORMAL |
| ... | ... | ... | ... | ... | ... | ... | ... |
| JK43889-L302 | OPQ31930 | 00301 | ABCCDE #01 | FGH #03-02 | 4/28/2017 10:06:22 | 4/28/2017 10:14:35 | NORMAL |
| JK43889-L302 | OPQ31930 | 00302 | ABCCDE #01 | FGH #03-02 | 4/28/2017 10:15:00 | 4/28/2017 10:23:23 | NORMAL |
| JK43889-L302 | OPQ31930 | 00303 | ABCCDE #01 | FGH #03-02 | 4/28/2017 10:23:54 | 4/28/2017 10:32:18 | NORMAL |

FIG. 8

| SERIAL NUMBER | NUMBER OF CHARACTERS OF EACH NUMERICAL CHARACTER | | | | | | NUMBER OF CHARACTERS OF EACH ALPHABETIC CHARACTER | | | | | | | NUMBER OF CHARACTERS OF EACH SYMBOL | | | | | |
|---|---|---|---|---|---|---|---|---|---|---|---|---|---|---|---|---|---|---|---|
| | 0 | 1 | 2 | ... | 8 | 9 | a | b | c | ... | t | v | w | , | ; | _ | > | ( | ) |
| 00159 | 333 | 23 | 57 | ... | 28 | 7 | 10 | 32 | 36 | ... | 21 | 4 | 50 | 301 | 3 | 9 | 30 | 3 | 3 |
| 00160 | 247 | 22 | 52 | ... | 25 | 6 | 9 | 26 | 32 | ... | 18 | 3 | 47 | 294 | 2 | 7 | 27 | 2 | 2 |
| 00161 | 333 | 23 | 57 | ... | 28 | 7 | 10 | 32 | 36 | ... | 21 | 4 | 50 | 297 | 3 | 9 | 30 | 3 | 3 |
| 00162 | 333 | 23 | 57 | ... | 28 | 7 | 10 | 32 | 36 | ... | 21 | 4 | 50 | 295 | 3 | 9 | 30 | 3 | 3 |
| 00163 | 333 | 23 | 57 | ... | 28 | 7 | 10 | 32 | 36 | ... | 21 | 4 | 50 | 285 | 3 | 9 | 30 | 3 | 3 |
| 00164 | 247 | 22 | 52 | ... | 25 | 6 | 9 | 26 | 32 | ... | 18 | 3 | 47 | 296 | 2 | 7 | 27 | 2 | 2 |
| 00165 | 247 | 22 | 52 | ... | 25 | 6 | 9 | 26 | 32 | ... | 18 | 3 | 47 | 292 | 2 | 7 | 27 | 2 | 2 |
| 00166 | 333 | 23 | 57 | ... | 28 | 7 | 10 | 32 | 36 | ... | 21 | 4 | 50 | 292 | 3 | 9 | 30 | 3 | 3 |
| 00167 | 333 | 23 | 57 | ... | 28 | 7 | 10 | 32 | 36 | ... | 21 | 4 | 50 | 289 | 3 | 9 | 30 | 3 | 3 |
| 00168 | 247 | 22 | 52 | ... | 25 | 6 | 9 | 26 | 32 | ... | 18 | 3 | 47 | 298 | 2 | 7 | 27 | 2 | 2 |
| 00169 | 333 | 23 | 57 | ... | 28 | 7 | 10 | 32 | 36 | ... | 21 | 4 | 50 | 156 | 3 | 9 | 30 | 3 | 3 |
| 00170 | 333 | 23 | 57 | ... | 28 | 7 | 10 | 32 | 36 | ... | 21 | 4 | 50 | 293 | 3 | 9 | 30 | 3 | 3 |
| 00171 | 333 | 23 | 57 | ... | 28 | 7 | 10 | 32 | 36 | ... | 21 | 4 | 50 | 287 | 3 | 9 | 30 | 3 | 3 |
| 00172 | 333 | 23 | 57 | ... | 28 | 7 | 10 | 32 | 36 | ... | 21 | 4 | 50 | 298 | 3 | 9 | 30 | 3 | 3 |
| 00173 | 247 | 22 | 52 | ... | 25 | 6 | 9 | 26 | 32 | ... | 18 | 3 | 47 | 286 | 2 | 7 | 27 | 2 | 2 |
| 00174 | 333 | 23 | 57 | ... | 28 | 7 | 10 | 32 | 36 | ... | 21 | 4 | 50 | 285 | 3 | 9 | 30 | 3 | 3 |
| 00175 | 247 | 22 | 52 | ... | 25 | 6 | 9 | 26 | 32 | ... | 18 | 3 | 47 | 290 | 2 | 7 | 27 | 2 | 2 |
| 00176 | 333 | 23 | 57 | ... | 28 | 7 | 10 | 32 | 36 | ... | 21 | 4 | 50 | 291 | 3 | 9 | 30 | 3 | 3 |
| 00177 | 333 | 23 | 57 | ... | 28 | 7 | 10 | 32 | 36 | ... | 21 | 4 | 50 | 294 | 3 | 9 | 30 | 3 | 3 |
| 00178 | 333 | 23 | 57 | ... | 28 | 7 | 10 | 32 | 36 | ... | 21 | 4 | 50 | 290 | 3 | 9 | 30 | 3 | 3 |
| 00179 | 247 | 22 | 52 | ... | 25 | 6 | 9 | 26 | 32 | ... | 18 | 3 | 47 | 287 | 2 | 7 | 27 | 2 | 2 |
| ... | ... | ... | ... | ... | ... | ... | ... | ... | ... | ... | ... | ... | ... | ... | ... | ... | ... | ... | ... |

FIG. 9

| SERIAL NUMBER | PASS/FAIL | TEXT FEATURE AMOUNT | |
|---|---|---|---|
| | | FIRST MAIN COMPONENT | SECOND MAIN COMPONENT |
| 00159 | NORMAL | -2.20 | 2.36 |
| 00160 | NORMAL | -2.06 | 0.82 |
| 00161 | NORMAL | -2.24 | -0.10 |
| 00162 | NORMAL | -2.80 | 3.07 |
| 00163 | NORMAL | -2.12 | 2.88 |
| 00164 | NORMAL | -1.66 | -0.56 |
| 00165 | NORMAL | -1.84 | 0.77 |
| 00166 | NORMAL | 3.89 | 6.96 |
| 00167 | NORMAL | -2.75 | 2.60 |
| 00168 | NORMAL | -2.61 | 3.97 |
| 00169 | ABNORMAL | 7.53 | 13.73 |
| 00170 | NORMAL | -2.65 | -0.80 |
| 00171 | NORMAL | 0.23 | -0.62 |
| 00172 | NORMAL | -2.30 | 1.73 |
| 00173 | NORMAL | -1.85 | 0.48 |
| 00174 | NORMAL | -1.73 | 4.50 |
| 00175 | NORMAL | -3.77 | -4.94 |
| 00176 | NORMAL | -6.77 | -4.68 |
| 00177 | NORMAL | -2.51 | 1.02 |
| 00178 | NORMAL | -1.97 | -0.51 |
| 00179 | NORMAL | 4.95 | -0.22 |
| ... | ... | ... | ... |

FIG. 11A

| SERIAL NUMBER | PASS/FAIL | NUMBER OF CHARACTERS OF EACH NUMERICAL CHARACTER | | | | | | NUMBER OF CHARACTERS OF EACH ALPHABETIC CHARACTER | | | | | | | NUMBER OF CHARACTERS OF EACH SYMBOL | | | | |
|---|---|---|---|---|---|---|---|---|---|---|---|---|---|---|---|---|---|---|
| | | 0 | 1 | 2 | ... | 8 | 9 | a | b | c | ... | t | v | w | . | : | _ | > | ( | ) |
| 00501 | - | 333 | 22 | 56 | ... | 28 | 7 | 13 | 32 | 36 | ... | 21 | 3 | 47 | 160 | 2 | 9 | 30 | 5 | 5 |

FIG. 11B

| SERIAL NUMBER | PASS/FAIL | TEXT FEATURE AMOUNT | |
|---|---|---|---|
| | | FIRST MAIN COMPONENT | SECOND MAIN COMPONENT |
| 00501 | - | 11.5 | 3.21 |

INFORMATION PROCESSING DEVICE, PRODUCTION FACILITY MONITORING METHOD, AND COMPUTER-READABLE RECORDING MEDIUM RECORDING PRODUCTION FACILITY MONITORING PROGRAM

CROSS-REFERENCE TO RELATED APPLICATION

This application is a continuation application of International Application PCT/JP2017/037388 filed on Oct. 16, 2017 and designated the U.S., the entire contents of which are incorporated herein by reference.

FIELD

The present invention relates to a production facility monitoring device, a production facility monitoring method, and a production facility monitoring program.

BACKGROUND

An abnormality of a plant and a facility is detected.
Related art is disclosed in Japanese Laid-open Patent Publication No. 2011-59790, Japanese Laid-open Patent Publication No. 2008-118068, Japanese Laid-open Patent Publication No. 2012-160056 and International Publication Pamphlet No. WO 2015/072085.

SUMMARY

According to an aspect of the embodiments, an information processing device includes: a memory; and a processor coupled to the memory and configured to: learn a classification rule that classifies an abnormal degree of a production facility from a text feature amount based on the text feature amount obtained from a number of texts included in a plurality of pieces of log data obtained in a predetermined process of the production facility and production history information of the production facility; extract a text feature amount of log data to be monitored obtained in the predetermined process of the production facility; and determine an abnormal degree of the production facility when the log data to be monitored is obtained based on the text feature amount and the classification rule.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of log data.
FIG. 5 is a diagram illustrating an example of a data structure of a production history information DB.
FIG. 8 is a table illustrating the number of characters obtained from each piece of log data acquired by a learning unit.
FIG. 9 is a table illustrating a first main component and a second main component of each piece of log data acquired by the learning unit and pass/fail.
FIG. 11A is a table corresponding to FIG. 8 regarding log data to be monitored,
and FIG. 11B is a table corresponding to FIG. 9 regarding log data to be monitored.

DESCRIPTION OF EMBODIMENTS

For example, states of the plant and the facility on the basis of sensor data (numerical data) is monitored and an abnormality is detected. Furthermore, an abnormality is detected from log data of a device.

However, in a case where a facility is monitored by using sensor data, an item that cannot be measured by a sensor cannot be monitored.

Furthermore, in a case where the facility is monitored by using log data, an item to be monitored is set in advance, and an abnormality that appears in the item to be monitored is detected. Therefore, an abnormality that appears in an item other than the item to be monitored cannot be detected.

In one aspect, a production facility monitoring device, a production facility monitoring method, and a production facility monitoring program that can determine an abnormal degree of a production facility with high accuracy on the basis of log data may be provided.

Figure 1:
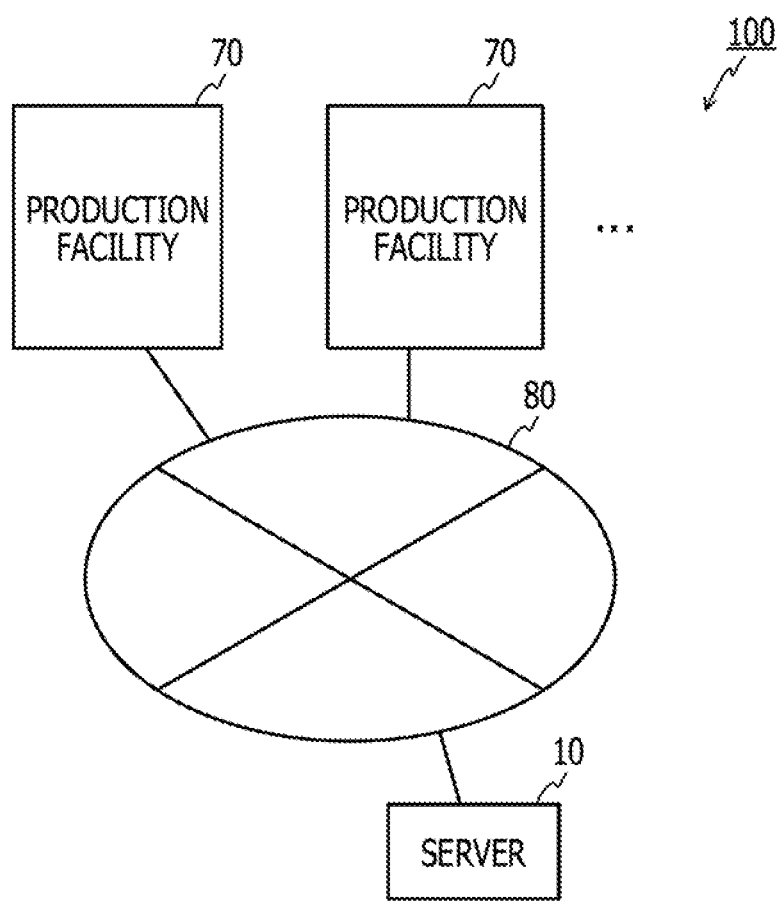
FIG. 1 is a diagram schematically illustrating a configuration of a production facility monitoring system according to an embodiment.

Hereinafter, an embodiment of a production facility monitoring system will be described in detail with reference to FIGS. 1 to 12. FIG. 1 schematically illustrates a configuration of a production facility monitoring system 100 according to an embodiment. As illustrated in FIG. 1, one or a plurality of production facilities 70 and a server 10 are included. The production facility 70 and the server 10 are connected to a network 80 such as the Internet or a Local Area Network (LAN).

The production facility 70 is a facility used in a product production process. In the production facility 70, log data in which states of the facility and a product are written is generated. The log data generated by the production facility 70 is transmitted to the server 10 via the network 80.

Figure 2:
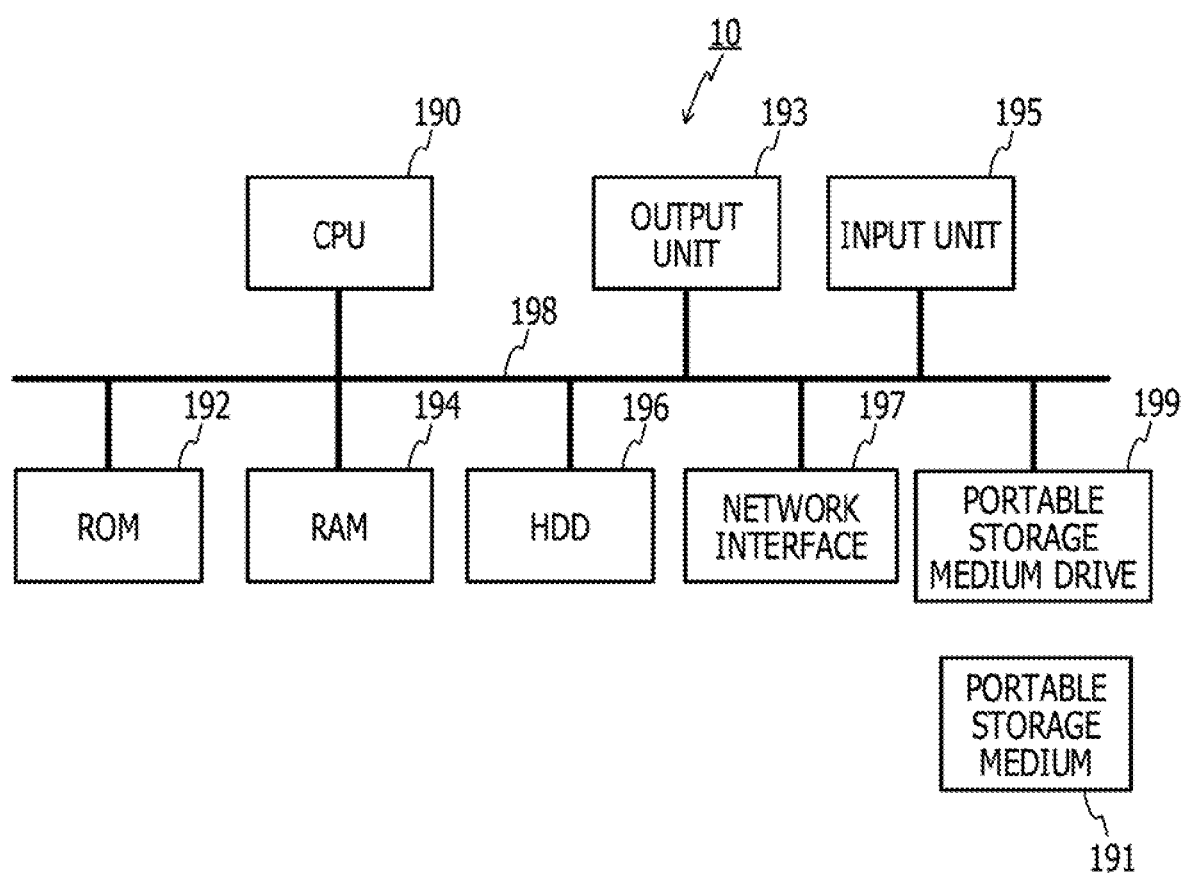
FIG. 2 is a diagram illustrating a hardware configuration of a server.

The server 10 is a device that determines a degree of abnormality (whether or not abnormality occurs, in present embodiment) of the production facility 70 on the basis of the log data received from the production facility 70 and outputs a determination result. FIG. 2 illustrates a hardware configuration of the server 10. As illustrated in FIG. 2, the server 10 includes a Central Processing Unit (CPU) 190, a Read Only Memory (ROM) 192, a Random Access Memory (RAM) 194, a storage unit (here, Hard Disk Drive (HDD)) 196, a network interface 197, an output unit 193, an input unit 195, a portable storage medium drive 199, or the like. Each component of the server 10 is connected to a bus 198. The output unit 193 includes a liquid crystal display, a speaker, and the like. The input unit 195 includes a keyboard, a mouse, a touch panel, and the like. In the server 10, the CPU 190 executes a program (including production facility monitoring program) stored in the ROM 192 or the HDD 196 or a program (including production facility monitoring program) read by the portable storage medium drive 199 from a portable storage medium 191, to implement the functions of the units illustrated in FIG. 3.

Figure 3:
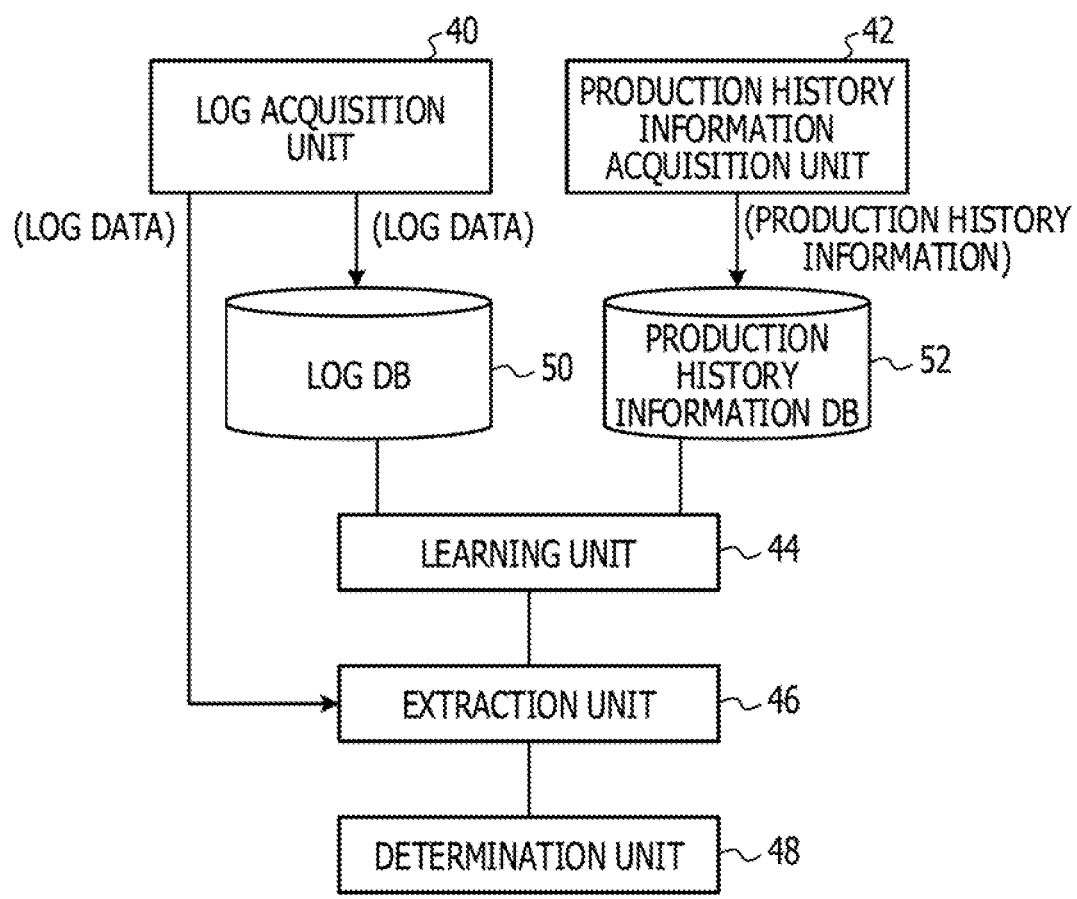
FIG. 3 is a functional block diagram of the server.

FIG. 3 illustrates a functional block diagram of the server 10. As illustrated in FIG. 3, in the server 10, by executing a program by the CPU 190, functions as a log acquisition unit 40, a production history information acquisition unit 42, a learning unit 44, an extraction unit 46, and a determination unit 48 are implemented.

The log acquisition unit 40 acquires the log data transmitted from each production facility 70 and stores the log data in a log DB 50. Furthermore, in a case where the acquired log data is log data to be monitored, the log acquisition unit 40 transmits the acquired log data to the extraction unit 46. Here, the log data is data as illustrated in FIG. 4. In the log data in FIG. 4, an apparatus name, a unit name, a program name, a lot number, a serial number, version information, each work record, error information, test data, a communication history, and the like are written. Furthermore, the log DB 50 is a database that stores the log data illustrated in FIG. 4.

The production history information acquisition unit 42 acquires production history information in which normal and abnormal states of the production facility 70 are recorded from the production facility 70 or other devices and stores the acquired information to the production history information DB 52. Here, the production history information DB 52 has a data structure as illustrated in FIG. 5. Specifically, as illustrated in FIG. 5, the production history information DB 52 includes fields of a unit name, a lot number, a serial number, an apparatus name, a process name, a start date and time, an end date and time, and pass/fail. The name of the production facility 70 is stored in the field of the unit name, a lot number and a serial number of a product produced in the production facility 70 are respectively stored in the fields of the lot number and the serial number. A name of a device including the production facility 70 is stored in the field of the apparatus name, and a name of a process performed by the production facility 70 is stored in the field of the process name. Information regarding a start date and time and information regarding an end date and time of the process performed by the production facility 70 are respectively stored in the fields of the start date and time and the end date and time, and information indicating pass or fail determined on the basis of the product (normal or abnormal) is stored in the field of pass/fail.

Returning to FIG. 3, the learning unit 44 generates a classification rule used to determine whether the production facility 70 is normal or abnormal from the log data to be monitored on the basis of the log data stored in the log DB 50 and the production history information stored in the production history information DB 52.

More specifically, first, the learning unit 44 extracts a text feature amount obtained from the number of texts (characters) included in each piece of log data. Here, the text feature amount can be the number of characters of the text included in the log data, the number of bytes of the text included in the log data, the number of lines of the log data, the number of types of texts included in the log data (the number of all the types of character code included in log data), the number of characters of each numerical character included in the log data, the number of characters of each alphabetic character included in the log data, the number of characters of each symbol included in the log data, the number of characters of each Japanese character included in the log data, or a main component of a vector obtained by aggregating two or more items described above. In the present embodiment, as an example, it is assumed that the text feature amount include a first main component and a second main component obtained by analyzing the main component of the vector including the number of characters of each numerical character, the number pf characters of each alphabetic character, and the number of characters of each symbol. Note that the text (character) means all the one-byte character of the JIS code. Furthermore, the number of alphabetic characters is a sum total of the number of uppercase and lowercase characters.

Then, the learning unit 44 creates a classification rule used to determine normal/abnormal from the text feature amount of the log data to be monitored on the basis of the text feature amount extracted from each piece of log data and the production history information (information indicating normal or abnormal) of the production facility 70 at the time when each piece of log data is obtained. Note that details of the classification rule will be further described later.

When acquiring the log data of the production facility 70 to be monitored from the log acquisition unit 40, the extraction unit 46 extracts a text feature amount of the acquired log data. Note that the text feature amount extracted by the extraction unit 46 is a feature amount which is the same as the text feature amount extracted from the log data at the time when the learning unit 44 creates the classification rule.

The determination unit 48 determines whether the production facility 70 to be monitored is normal or abnormal by using the text feature amount extracted by the extraction unit 46 and the classification rule generated by the learning unit 44. In a case of determining that the production facility 70 to be monitored is abnormal, the determination unit 48 notifies the determination result via the output unit 193 (output warning).

(About Processing by Server 10)

Figure 6:
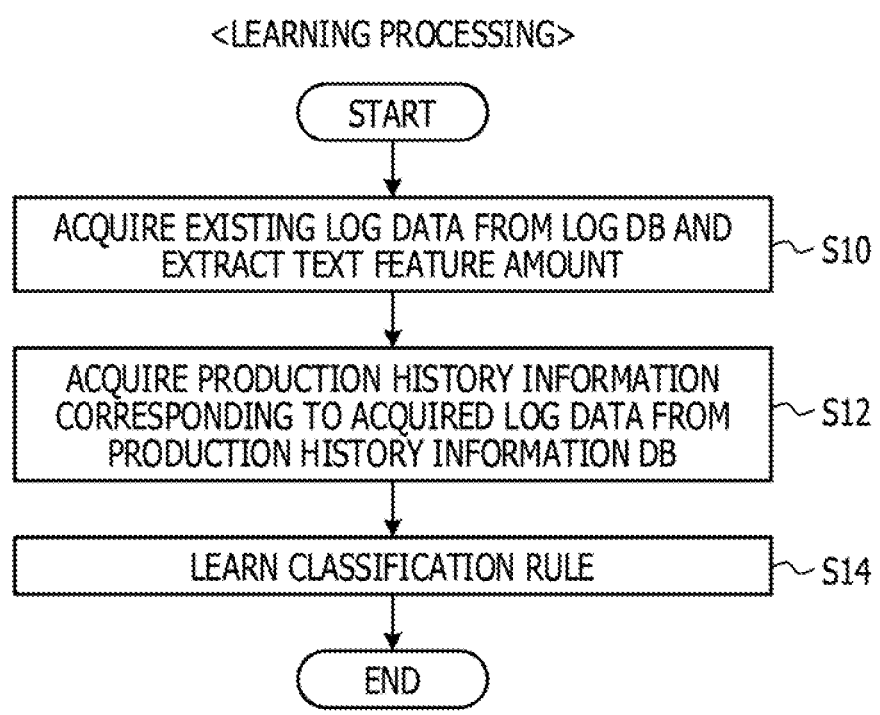
FIG. 6 is a flowchart illustrating learning processing.
Figure 7:
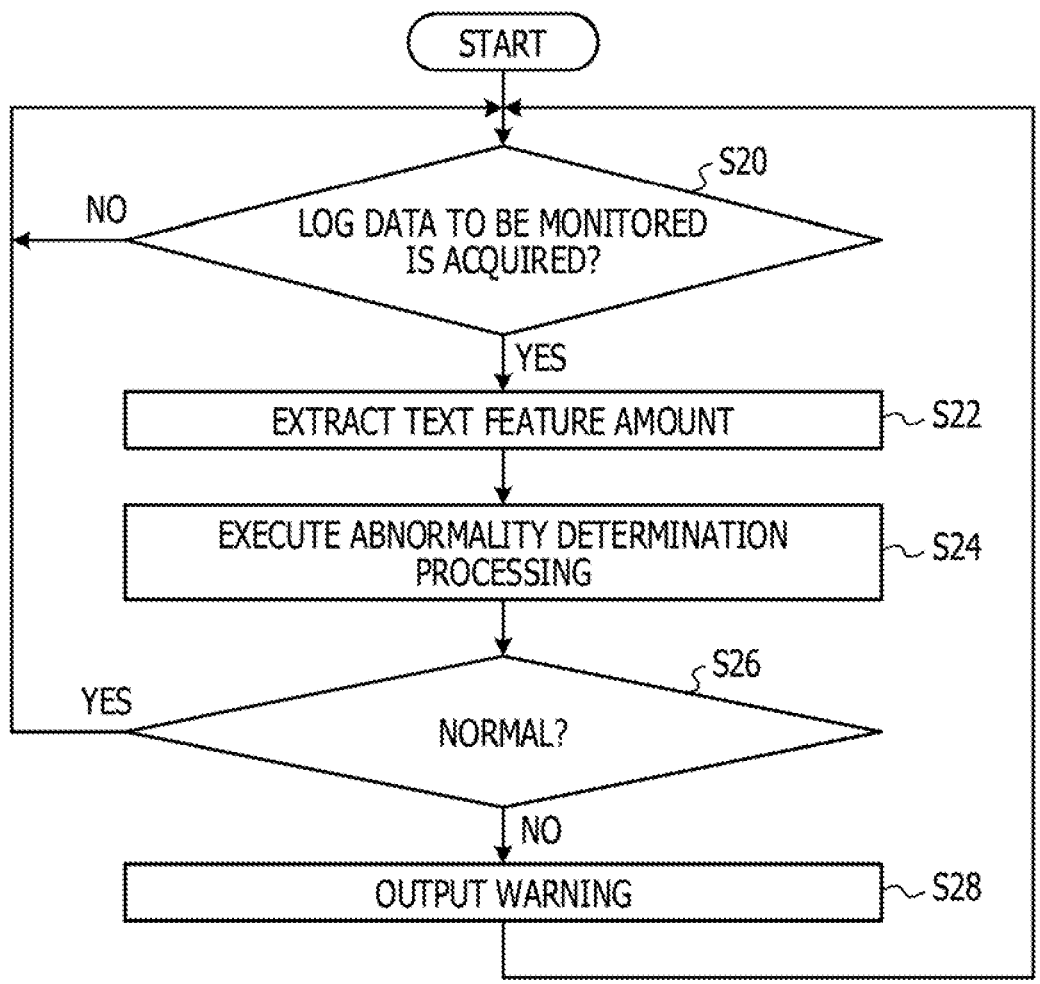
FIG. 7 is a flowchart illustrating abnormality determination processing.

Next, processing by the server 10 will be described with reference to the flowcharts in FIGS. 6 and 7. FIG. 6 illustrates a flowchart of an example of processing (learning processing) of the learning unit 44, and FIG. 7 illustrates a flowchart of an example of processing (abnormality determination processing) of the extraction unit 46 and the determination unit 48.

(About Learning Processing)

The learning unit 44 executes the processing in FIG. 6 at a predetermined learning timing. Note that the predetermined learning timing is, for example, a timing for each predetermined time. However, the predetermined learning timing is not limited to this and can be a timing when a predetermined number of pieces of log data is newly stored in the log DB 50, for example.

In the processing in FIG. 6, first, in step S10, the learning unit 44 acquires existing log data from the log DB 50 and extracts a text feature amount. Note that the learning unit 44 acquires the log data of the same process executed by the same production facility 70. In the present embodiment, as illustrated in FIG. 8, it is assumed that pieces of log data respectively having serial numbers 00159, 00160, . . . have been acquired. Note that the learning unit 44 obtains the number of characters of each numerical character, the number of characters of each alphabetic character, and the number of characters of each symbol from the log data as illustrated in FIG. 8. Then, the learning unit 44 extracts the first main component and the second main component obtained by analyzing the main component of the vector including the number of characters of each numerical character, the number of characters of each alphabetic character, and the number of characters of each symbol obtained from each piece of log data as the text feature amounts. In FIG. 9, the first main component and the second main component as the text feature amounts of each piece of log data are illustrated in a table.

Next, in step S12, the learning unit 44 acquires production history information corresponding to the acquired log data from the production history information DB 52. In this case, the production history information corresponding to the log data is specified from the production history information DB 52 in FIG. 5 by using the serial number and the like, and information indicating pass/fail (normal/abnormal) when each piece of log data is acquired is acquired. Note that, in the table in FIG. 9, the information indicating pass/fail (normal/abnormal) is associated with the serial number of the log data.

Figure 10:
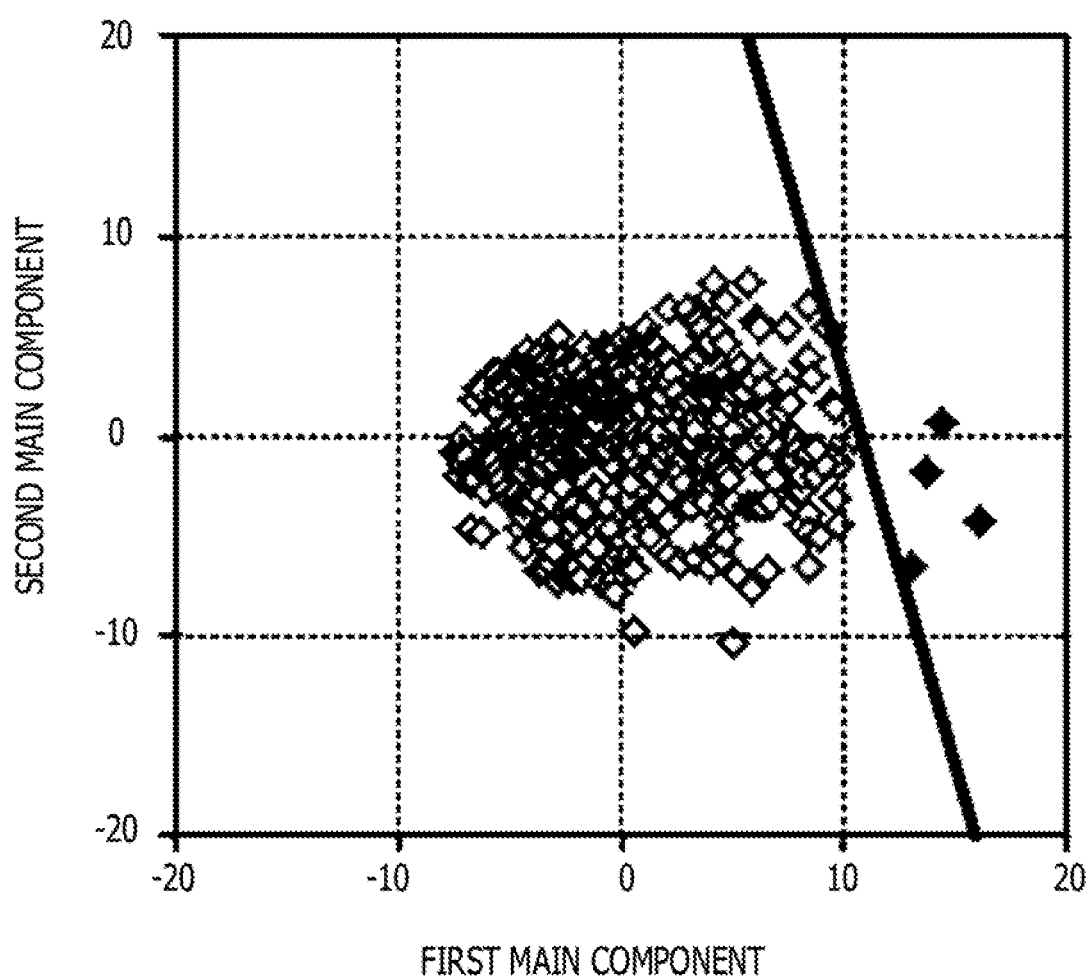
FIG. 10 is a diagram for explaining a classification rule learning method.
Figure 12:
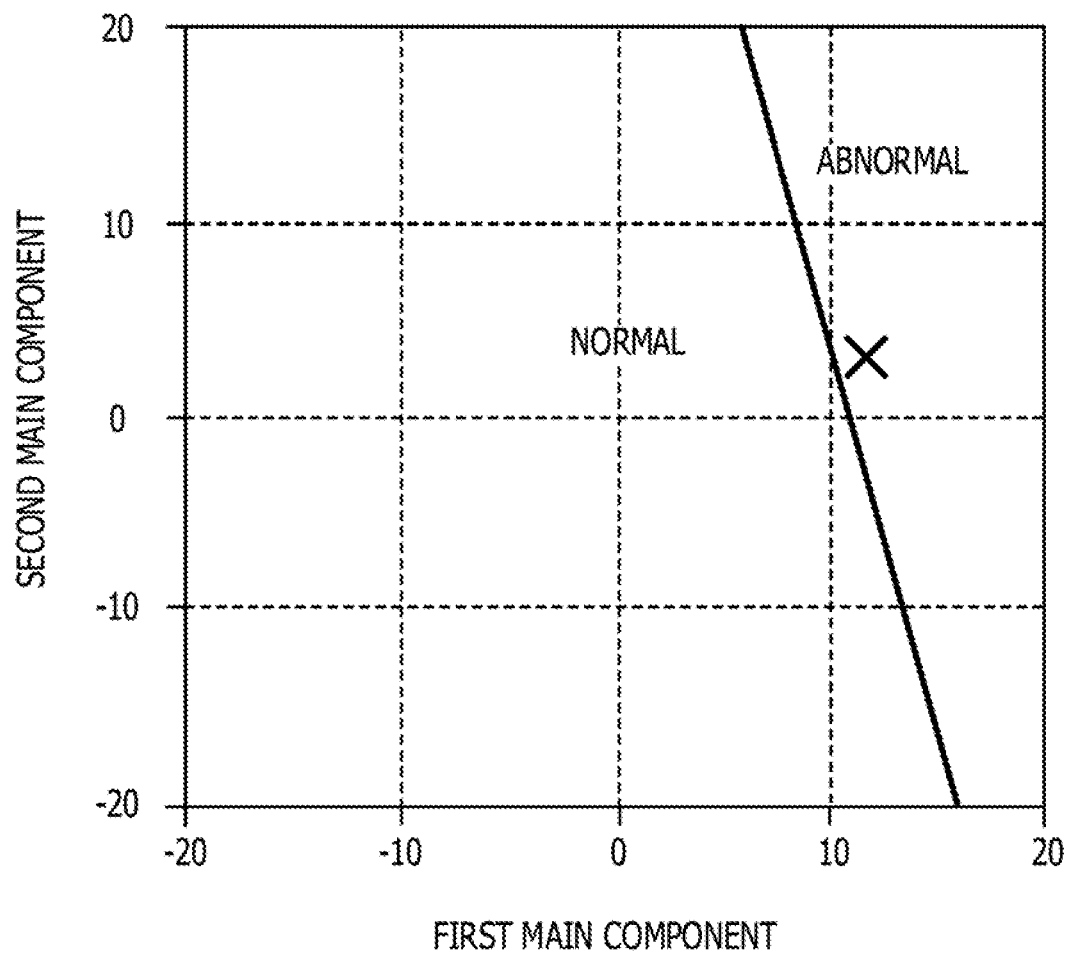
FIG. 12 is a diagram for explaining an abnormality determination method using the classification rule.

In step S14, the learning unit 44 learns (machine learning) a classification rule. Specifically, as illustrated in FIG. 10, the learning unit 44 plots the text feature amount of each piece of log data on a graph, specifies a boundary that can classify normal and abnormal by two-class linear classification, and creates the classification rule used to classify a normal range and an abnormal range. In the example in FIG. 10, the learning unit 44 creates the classification rule that classifies the left side of a boundary line (thick solid line) in FIG. 10 as normal and the right side as abnormal.

As described above, when the processing up to step S14 is terminated, all the processing in FIG. 6 is terminated. Note that all the processes in the processing in FIG. 6 are executed.

(About Abnormality Determination Processing)

Next, abnormality determination processing will be described with reference to the flowchart in FIG. 7.

First, in step S20, the extraction unit 46 waits until the log data to be monitored is acquired. In other words, when acquiring new log data from the log acquisition unit 40 as a monitoring target, the extraction unit 46 shifts to step S22.

When shifting to step S22, the extraction unit 46 extracts a text feature amount from the acquired log data to be monitored. Here, it is assumed that the log data extracted by the extraction unit 46 be log data having a serial number=00501 indicated in FIG. 11A. The extraction unit 46 obtains the number of characters of each numerical character, the number of characters of each alphabetic character, and the number of characters of each symbol indicated in FIG. 11A from the log data. Then, the extraction unit 46 obtains a first main component and a second main component indicated in FIG. 11B by analyzing the main component of the vector including each of the obtained numbers of characters and sets the first main component and the second main component as text feature amounts.

Next, in step S24, the determination unit 48 executes the abnormality determination processing. For example, in a case of the log data to be monitored in FIG. 11B, when the log data is plotted on a coordinate system in FIG. 12 on the basis of the first main component and the second main component, the log data is plotted on a position indicated by x. In this case, since the plotted position is positioned on the right side of the boundary line (thick solid line) defined by the classification rule, the determination unit 48 determines that the production facility 70 is "abnormal".

Next, in step S26, the determination unit 48 determines whether or not the production facility 70 is normal. In a case where the determination in step S26 is affirmative (in a case of normal), the processing returns to step S20. On the other hand, in a case where the determination in step S26 is denied (in a case of abnormal), the processing shifts to step S28.

In a case where the processing shifts to step S28, the determination unit 48 outputs a warning. In this case, the determination unit 48 notifies that an abnormality occurs in the production facility 70 by an image and/or sound via the output unit 193. Note that the notification is not limited to this, and the determination unit 48 may transmit warning information to an external device (terminal and the like) that can communicate with the server 10.

After the processing in step S28 is terminated, the processing returns to step S20. Then, the processing is repeatedly executed.

As described in detail above, according to the present embodiment, the learning unit 44 learns the classification rule that classifies whether the production facility 70 is normal or abnormal from the text feature amount on the basis of the text feature amount (for example, first main component and second main component) obtained from the number of texts included in the plurality of pieces of log data obtained in a predetermined process of the production facility 70 and the production history information of the production facility, the extraction unit 46 extracts the text feature amount of the log data to be monitored obtained in the predetermined process of the production facility 70, and the determination unit 48 determines whether the production facility 70 is normal or abnormal when the log data to be monitored is obtained on the basis of the extracted text feature amount and the classification rule. With this operation, it is possible to monitor all the regions of the log data without specifying a target character string and a target region in advance and to detect an abnormal state of the production facility 70. Therefore, it is possible to avoid a situation in which an abnormality described in a part other than the specified target character string and target region cannot be detected, and it is possible to detect an unexpected abnormality. Furthermore, there is a case where no existence of the specified target character string indicates an abnormality. However, in such a case, the abnormality can be detected according to the present embodiment. Furthermore, since it is not necessary to specify the target character string and the target region, the number of steps in setting can be reduced. Furthermore, since the text feature amount is obtained from the number of texts of the log data, a processing amount can be reduced in comparison with a case where the character string and the like is searched.

Furthermore, according to the present embodiment, the first main component and the second main component obtained as a result of the main component analysis on the vector including the number of texts included in the log data are used as the text feature amounts. Therefore, even if the target character string and the like is not determined in advance, it is possible to set a classification rule with high accuracy, and it is possible to determine normality or abnormality with high accuracy.

Note that, in the above embodiment, three or more main components (for example, first to third main components) obtained by the main component analysis can be used as the text feature amounts. For example, if the three main components are used, the boundary that classifies normal and abnormal defined by the classification rule is a plane. Furthermore, the text feature amount may be a single main component (for example, first main component). In this case, the boundary that classifies normal and abnormal defined by the classification rule is a point (threshold).

Note that, in the above embodiment, a case has been described where the text feature amounts are the first main component and the second main component obtained as a result of the main component analysis on the vector including the number of texts included in the log data. However, the text feature amount is not limited to this. For example, the text feature amount may be a difference or a correlation coefficient of the numbers of texts of the log data obtained in the same process that is continuously executed.

Note that, in the above embodiment, a case has been described where the classification rule is created as illustrated in FIG. 10 and the normal/abnormal determination is made by using the created classification rule. However, the present invention is not limited to this. For example, the classification rule may be created by a plurality of methods, and the normal/abnormal determination may be made by using a classification rule with the highest determination accuracy among the plurality of created classification rules. In this case, as the plurality of methods for creating the classification rule, in addition to the method in the above embodiment, a method such as a decision tree, a support vector machine, a random forest, or the like can be used. Furthermore, when the classification rule with the highest determination accuracy is specified, so-called cross-validation may be performed in which the log data acquired from the log DB 50 is divided into two, and each classification rule is created by using one of the divided data, and the determination accuracy of each classification rule is obtained by using another one.

Note that, in the above embodiment, a case has been described above where it is determined whether the production facility 70 is normal or abnormal (determine one of two states). However, the present invention is not limited to this, and it may be determined which one of three or more states the production facility 70 is in. In this case, for example, if "normal", "abnormal", "high abnormal tendency", and the like is stored in the field of "pass/fail" in the production history information DB 52, the classification rule used to determine which one of the three or more states the production facility 70 is in can be created by creating the classification rule on the basis of this.

Note that the above processing functions can be implemented by a computer. In that case, a program is provided that describes processing content of a function that a processing apparatus should have. The program is executed on the computer, whereby the above processing function is implemented on the computer. The program in which the processing content is written can be recorded in a computer-readable reading medium (except for carrier wave).

In the case of distributing the program, for example, the program is sold in a form of a portable recording medium such as a digital versatile disc (DVD) or a compact disc read only memory (CD-ROM) in which the program is recorded. Furthermore, it is possible to store the program in a storage device of a server computer and transfer the program from the server computer to another computer through a network.

The computer which executes the program stores, for example, the program recorded in the portable reading medium or the program transferred from the server computer in a storage device of the computer. Then, the computer reads the program from the storage device of the computer and executes processing according to the program. Note that, the computer can also read the program directly from the portable recording medium and execute processing according to the program. Furthermore, the computer also can sequentially execute processing according to the received program each time when the program is transferred from the server computer.

The embodiment described above is an example of a preferred embodiment of the present invention. However, the present invention is not limited to this, and a variety of modifications can be made without departing from the scope of the present invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
    a memory; and
    a processor coupled to the memory and configured to:
        learn a classification rule that classifies an abnormal degree of a production facility from a text feature amount based on the text feature amount obtained from a number of texts included in a plurality of pieces of log data obtained in a predetermined process of the production facility and production history information of the production facility;
        extract a text feature amount of log data to be monitored obtained in the predetermined process of the production facility; and
        determine an abnormal degree of the production facility when the log data to be monitored is obtained based on the text feature amount and the classification rule.

2. The information processing device according to claim 1, wherein
    the text feature amount is obtained from at least one item of a number of characters of a text included in the log data, a number of bytes of the text included in the log data, a number of lines of the log data, a number of types of texts included in the log data, a number of characters of each numerical character included in the log data, a number of characters of each alphabetic character included in the log data, a number of characters of each symbol included in the log data, and a number of characters of each Japanese character included in the log data.

3. The information processing device according to claim 2, wherein
    the text feature amount is a main component of a vector obtained by aggregating two or more of the above items.

4. The information processing device according to claim 2, wherein
    the text feature amount is one of a difference and a correlation coefficient of the item of the log data obtained in the predetermined process that is continuously executed.

5. The information processing device according to claim 1, wherein the processor is configured to determine a classification rule used for determination by generating a plurality of classification rules based on different text feature amounts and performing cross-validation on the plurality of classification rules.

6. A production facility monitoring comprising:
    Learning, by a computer, a classification rule that classifies an abnormal degree of a production facility from a text feature amount based on the text feature amount obtained from a number of texts included in a plurality of pieces of log data obtained in a predetermined process of the production facility and production history information of the production facility;

extracting a text feature amount of log data to be monitored obtained in the predetermined process of the production facility; and determining an abnormal degree of the production facility when the log data to be monitored is obtained based on the extracted text feature amount and the classification rule.

7. The production facility monitoring method according to claim 6, wherein the text feature amount is obtained from at least one item of a number of characters of a text included in the log data, a number of bytes of the text included in the log data, a number of lines of the log data, a number of types of texts included in the log data, a number of characters of each numerical character included in the log data, a number of characters of each alphabetic character included in the log data, a number of characters of each symbol included in the log data, and a number of characters of each Japanese character included in the log data.

8. The production facility monitoring method according to claim 7, wherein the text feature amount is a main component of a vector obtained by aggregating two or more of the above items.

9. The production facility monitoring method according to claim 7, wherein the text feature amount is one of a difference and a correlation coefficient of the item of the log data obtained in the predetermined process that is continuously executed.

10. The production facility monitoring method according to claim 6, wherein in the learning processing, a classification rule used for determination is determined by generating a plurality of classification rules based on different text feature amounts and performing cross-validation on the plurality of classification rules.

11. A non-transitory computer-readable recording medium recording a production facility monitoring program causing a computer to execute processing comprising:

learning a classification rule that classifies an abnormal degree of the production facility from a text feature amount based on the text feature amount obtained from a number of texts included in a plurality of pieces of log data obtained in a predetermined process of the production facility and production history information of the production facility;

extracting a text feature amount of log data to be monitored obtained in the predetermined process of the production facility; and determining an abnormal degree of the production facility when the log data to be monitored is obtained based on the extracted text feature amount and the classification rule.

\* \* \* \* \*